(12) United States Patent
Yamamoto (10) Patent No.: US 8,325,393 B2
(45) Date of Patent: Dec. 4, 2012

(54) APPARATUS AND METHOD FOR READING COLOR CHART AND COMPUTER-READABLE STORAGE MEDIUM

(75) Inventor: Tsuyoshi Yamamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 599 days.

(21) Appl. No.: 12/483,182

(22) Filed: Jun. 11, 2009

(65) Prior Publication Data

US 2009/0316234 A1 Dec. 24, 2009

(30) Foreign Application Priority Data

Jun. 20, 2008 (JP) ................................. 2008-162302

(51) Int. Cl.
*H04N 1/46* (2006.01)
*H04N 1/60* (2006.01)
*G03F 3/08* (2006.01)
*G09G 5/02* (2006.01)
*G06T 12/00* (2006.01)

(52) U.S. Cl. ........ 358/505; 358/523; 358/520; 358/504; 358/1.9; 345/595; 345/428; 345/600; 347/15; 347/14; 347/19; 101/211

(58) Field of Classification Search .................. 358/595, 358/523, 1.9, 505, 518; 101/211; 345/595, 345/428, 600; 347/15, 14, 19
See application file for complete search history.

(56) References Cited

U.S. PATENT DOCUMENTS

| | | | | |
|---|---|---|---|---|
| 5,218,671 A | * | 6/1993 | Liao et al. | 345/595 |
| 5,489,998 A | * | 2/1996 | Yamada et al. | 358/523 |
| 2003/0081229 A1 | * | 5/2003 | Underwood et al. | 358/1.9 |
| 2004/0182262 A1 | * | 9/2004 | Seymour | 101/211 |

FOREIGN PATENT DOCUMENTS

| | | | |
|---|---|---|---|
| JP | 2004-138609 A | | 5/2004 |
| JP | 2005-061926 | * | 3/2005 |
| JP | 2005-061926 A | | 3/2005 |
| JP | 2005-341035 A | | 12/2005 |

* cited by examiner

*Primary Examiner* — Akwasi M Sarpong
(74) *Attorney, Agent, or Firm* — Canon USA Inc IP Division

(57) ABSTRACT

Provided is a method for automatically determining an error of a user operation or a calorimeter caused when the calorimeter is manually slid to measure the colors of color patches on a row-by-row basis. Also provided is a method capable of determining an error or a scanning direction using a feature value obtained from the calorimetric values without using fixed reference and threshold values for each patch.

11 Claims, 7 Drawing Sheets

| ROW NUMBER | NUMBER OF JUMP PATCHES | SCANNING DIRECTION | INDEX OF JUMP PATCH |
|---|---|---|---|
| 1, 4, 7, 10, 13, 16, 19, 22, 25, | | LEFT TO RIGHT (FORWARD) | 9 |
| 28, 31, 34, 37, 40, 43, 46, 49 | 1 | RIGHT TO LEFT (BACKWARD) | 7 |
| 2, 5, 8, 11, 14, 17, 20, 23, 26, | | LEFT TO RIGHT (FORWARD) | 3, 12 |
| 29, 32, 35, 38, 41, 44, 47 | 2 | RIGHT TO LEFT (BACKWARD) | 4, 13 |
| 3, 6, 9, 12, 15, 18, 21, 24, 27, | | LEFT TO RIGHT (FORWARD) | 6, 15 |
| 30, 33, 36, 39, 42, 45, 48 | 2 | RIGHT TO LEFT (BACKWARD) | 1, 10 |

| ROW NUMBER | NUMBER OF JUMP PATCHES | INDEX OF JUMP PATCH |
|---|---|---|
| 1, 10, 19, 28, 37 | 1 | 9 |
| 2, 11, 20, 29, 38 | 2 | 1, 10 |
| 3, 12, 21, 30, 39 | 2 | 2, 11 |
| 4, 13, 22, 31, 40 | 2 | 3, 12 |
| 5, 14, 23, 32, 41 | 2 | 4, 13 |
| 6, 15, 24, 33, 42 | 2 | 5, 14 |
| 7, 16, 25, 34, 43 | 2 | 6, 15 |
| 8, 17, 26, 35 | 2 | 7, 16 |
| 9, 18, 27, 36 | 1 | 8 |

FIG. 6

| INDEX | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| FIRST ROW | R=0 G=0 B=0 | 0 0 32 | 0 0 64 | 0 0 96 | 0 0 128 | 0 0 160 | 0 0 192 | 0 0 224 | 0 0 255 | 0 32 0 | 0 32 32 | 0 32 64 | 0 32 96 | 0 32 128 | 0 32 160 |
| SECOND ROW | 0 32 192 | 0 32 224 | 0 32 255 | 0 64 0 | 0 64 32 | 0 64 64 | 0 64 96 | 0 64 128 | 0 64 160 | 0 64 192 | 0 64 224 | 0 64 255 | 0 96 0 | 0 96 32 | 0 96 64 |
| THIRD ROW | 0 96 96 | 0 96 128 | 0 96 160 | 0 96 192 | 0 96 224 | 0 96 255 | 0 128 0 | 0 128 32 | 0 128 64 | 0 128 96 | 0 128 128 | 0 128 160 | 0 128 192 | 0 128 224 | 0 128 255 |
| FOURTH ROW | 0 160 0 | 0 160 32 | 0 160 64 | 0 160 96 | 0 160 128 | 0 160 160 | 0 160 192 | 0 160 224 | 0 160 255 | 0 196 0 | 0 196 32 | 0 196 64 | 0 196 96 | 0 196 128 | 0 196 160 |
| FIFTH ROW | 0 196 192 | 0 196 224 | 0 196 255 | 0 224 0 | 0 224 32 | 0 224 64 | 0 224 96 | 0 224 128 | 0 224 160 | 0 224 192 | 0 224 224 | 0 224 255 | 0 255 0 | 0 255 32 | 0 255 64 |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |

FIG. 7

| ROW NUMBER | NUMBER OF JUMP PATCHES | SCANNING DIRECTION | INDEX OF JUMP PATCH |
|---|---|---|---|
| 1, 4, 7, 10, 13, 16, 19, 22, 25, 28, 31, 34, 37, 40, 43, 46, 49 | 1 | LEFT TO RIGHT (FORWARD) | 9 |
| | | RIGHT TO LEFT (BACKWARD) | 7 |
| 2, 5, 8, 11, 14, 17, 20, 23, 26, 29, 32, 35, 38, 41, 44, 47 | 2 | LEFT TO RIGHT (FORWARD) | 3, 12 |
| | | RIGHT TO LEFT (BACKWARD) | 4, 13 |
| 3, 6, 9, 12, 15, 18, 21, 24, 27, 30, 33, 36, 39, 42, 45, 48 | 2 | LEFT TO RIGHT (FORWARD) | 6, 15 |
| | | RIGHT TO LEFT (BACKWARD) | 1, 10 |

FIG. 8

APPARATUS AND METHOD FOR READING COLOR CHART AND COMPUTER-READABLE STORAGE MEDIUM

BACKGROUND OF THE INVENTION

1. Field of the Invention

The present invention relates to a technique for determining an error or automatically determining a scanning direction in the use of a calorimeter that is manually operated to measure a color chart including an array of color patches on a row-by-row basis.

2. Description of the Related Art

According to one of color chart measuring methods, a user manually positions a calorimeter and manually slides the calorimeter along each row of color patches to perform colorimetry on the color patches, i.e., measure the colors of the color patches on a row-by-row basis. The calorimeter samples calorimetric data at very short time intervals during sliding and analyzes the acquired calorimetric data to automatically recognize each boundary between adjacent patches such that the calorimetric values of the color patches in one row can be obtained by one sliding operation. Such a calorimeter is smaller and more inexpensive than a calorimeter that is automatically positioned. Accordingly, the method using the above-described calorimeter is easily introduced into small-scale firms and small office home offices.

In a calorimetric system using such a calorimeter, a user's operation error causes the system to not properly measure the colors of patches expected. Probable user's operation errors include an error caused by positioning of the calorimeter relative to an improper row of color patches, an error caused by partial measurement of a proper row (i.e., the calorimeter is positioned relative to a proper row but the proper row is partially subjected to colorimetry), and an error caused when sliding is performed in the backward direction. In addition, in some cases, a user's inaccurate sliding operation causes the calorimeter to be shifted from a proper row to the adjacent row during sliding. Furthermore, if the calorimeter misrecognizes the boundary between adjacent patches, accurate colorimetry is not performed. In this case, a patch is skipped or the calorimetric value of a nonexistent patch is added. Upon occurrence of both of the skip and the addition, although the total number of patches is correct, the acquired calorimetric data includes an error (hereinafter, referred to as "calorimetric data error").

In the use of the manually-operated calorimeter, the following error determination technique has been generally used. Error determination is performed using two values, i.e., a reference value for each patch of a chart to be color-measured and a threshold value serving as a tolerance. A system has previously stored these values and compares a measured value of a patch with the reference value. When the measured value deviates from the reference value by more than the threshold value, the system determines that colorimetry has failed, namely, an error of colorimetry. For example, Japanese Patent Laid-Open No. 2005-061926 discloses such a calorimetric system.

The related-art method, however, has the following disadvantages.

The system has previously stored the reference values for the respective color patches. Accordingly, when the color of a patch deviates from the corresponding reference value by more than a predetermined threshold value, an error is determined even though the color of the patch is correctly measured. For example, to generate a color profile for a printer, a user allows the printer to print a color chart onto a sheet of paper on which the user intends to generate a profile. The user waits until the colors reach stability and then measures the colors in the color chart. Sheets onto which the user intends to generate a color profile vary. In some cases, therefore, a specific color among the colors of patches printed is emphasized depending on the characteristics of a sheet. In the use of a colored sheet, the color of the printed sheet appears in a pale color. In this case, if the threshold value is too strict, an error is determined even through colorimetry is correctly performed. Unfortunately, the user cannot continue colorimetry.

Assuming that the threshold value is loosened to avoid the above-described problem, when an error actually occurs, the error cannot be determined.

As described above, it is difficult to properly determine a reference value and a threshold value for each patch. It is necessary to determine a reference value and a threshold value for each patch and the order of arrangement of color patches by trial and error and assure the quality of the values and the arrangement order. Therefore, it takes long time and high cost. In some cases, error determination is not correctly performed because a reference value and a threshold value are improper.

SUMMARY OF THE INVENTION

The present invention provides a method for determining an error without using a reference value and a threshold value.

According to an aspect of the present invention, a color chart reading apparatus is provided for acquiring calorimetric values of color patches using a color chart in which a first feature value, relating to the color arrangement of color patches, in each row differs from that in the adjacent row and using a calorimeter which is manually slid by a user to perform colorimetry while scanning the color patches in the color chart on a row-by-row basis. The color chart reading apparatus includes: a calorimetric value storage unit configured to store a first feature value for each row number, the first feature value being obtained when colorimetry is performed while the user slides the calorimeter in a predetermined scanning direction relative to the color chart; a feature value calculation unit configured to calculate a feature of the color arrangement of the color patches in a measured row as a second feature value based on the calorimetric values of the color patches acquired by the calorimeter; and a determination unit configured to compare the first feature value stored by the calorimetric value storage unit with the second feature value calculated by the feature value calculation unit to determine an error when the first feature value does not match with the second feature value.

According to another aspect of the present invention, a color chart reading method is provided for acquiring the calorimetric values of color patches using a color chart in which a first feature value, relating to the color arrangement of color patches, in each row differs from that in the adjacent row and using a calorimeter which is manually slid by a user to perform colorimetry while scanning the color patches in the color chart on a row-by-row basis. The color chart reading method includes: a storing step of storing a first feature value for each row number, the first feature value being obtained when colorimetry is performed while the user slides the calorimeter in a predetermined scanning direction relative to the color chart; a calculating step of calculating a feature of the color arrangement of the color patches in a measured row as a second feature value based on the calorimetric values of the color patches acquired by the calorimeter; and a determining step of comparing the stored first feature value with the calculated second feature value to determine an error when the first feature value does not match with the second feature value.

According to another aspect of the present invention, there is provided a computer-readable storage medium that stores a computer-executable color chart reading program allowing a computer to perform color chart reading for acquisition of the calorimetric values of color patches using a color chart in which a first feature value, relating to the color arrangement of color patches, in each row differs from that in the adjacent row and using a calorimeter which is manually slid by a user to perform colorimetry while scanning the color patches in the color chart on a row-by-row basis. The color chart reading program includes: a storing step of storing a first feature value for each row number, the first feature value being obtained when colorimetry is performed while the user slides the calorimeter in a predetermined scanning direction relative to the color chart; a calculating step of calculating a feature of the color arrangement of the color patches in a measured row as a second feature value based on the calorimetric values of the color patches acquired by the calorimeter; and a determining step of comparing the stored first feature value with the calculated second feature value to determine an error when the first feature value does not match with the second feature value.

Further features of the present invention will become apparent from the following description of exemplary embodiments with reference to the attached drawings.

DESCRIPTION OF THE EMBODIMENTS

Exemplary embodiments of the present invention will be described below with reference to the drawings. The following embodiments are not intended to restrict the present invention described in the appended claims. All of the combinations of features described in the embodiments are not necessary for solving problems in accordance with an embodiment of the present invention. Values held in a table in the embodiments can be obtained by calculation. An information storage unit in an embodiment of the present invention may be replaced with a method based on calculation.

Figure 1:
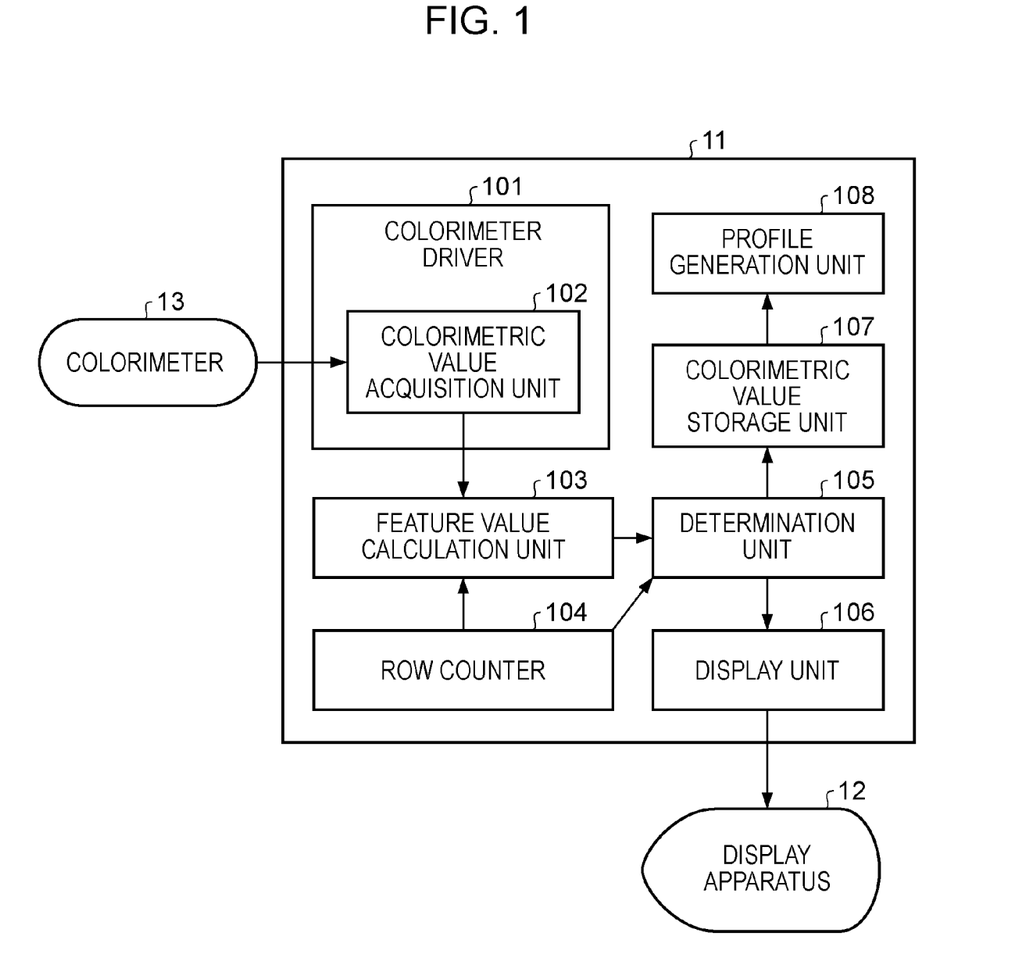
FIG. 1 is a diagram illustrating the structure of a computer in accordance with an embodiment of the present invention.

The structure of a computer (color chart reading apparatus) in accordance with an embodiment of the present invention will be described with reference to a block diagram of FIG. 1. Referring to FIG. 1, the computer 11 includes a CPU or MPU (not shown), a ROM, a RAM, and an HDD. A display apparatus 12 displays information. A calorimeter 13 is manually positioned and slid by a user along a row of color patches to measure the colors of the color patches on a row-by-row basis. The calorimeter 13 analyzes calorimetric data acquired during sliding to automatically recognize each boundary between adjacent patches, so that the colors of the patches in one row can be measured by one operation.

A calorimeter driver 101 communicates with the calorimeter 13 to perform control for colorimetry or receive data (calorimetric values) from the calorimeter 13. The calorimeter driver 101 includes a calorimetric value acquisition unit 102 to acquire calorimetric values on a row-by-row basis from the calorimeter 13. A feature value calculation unit 103 acquires calorimetric values of one row to calculate a feature value. A row counter 104 stores a row number of target color patches which are being subjected to colorimetry. The row counter 104 outputs data indicating the row number of the target color patches to the feature value calculation unit 103 and a determination unit 105. The determination unit 105 compares a feature value of a measured row obtained by the feature value calculation unit 103 with a feature value of the row acquired from the row counter 104 to determine whether the feature values agree (match) with each other. The ROM or RAM (not illustrated) has previously stored a table (see FIG. 5) including the number of feature values and the position of a feature value related to each row number. The table is used to obtain a feature value related to a row number obtained from the row counter 104. The table will be described in detail later with reference to FIGS. 4 and 5. The feature value calculation unit 103 calculates a feature value using this table. The determination unit 105 compares feature values using the table. A display unit 106 notifies the user of the next operation based on of the result of determination by the determination unit 105. Specifically, the display unit 106 allows the display apparatus 12 to display a message, thus notifying the user of the next operation. A calorimetric value storage unit 107 stores a calorimetric value acquired by the calorimetric value acquisition unit 102 in relation to the position of the corresponding color patch. A profile generation unit 108 generates a color profile using the calorimetric values of respective color patches obtained from the calorimetric value storage unit 107.

Figure 2:
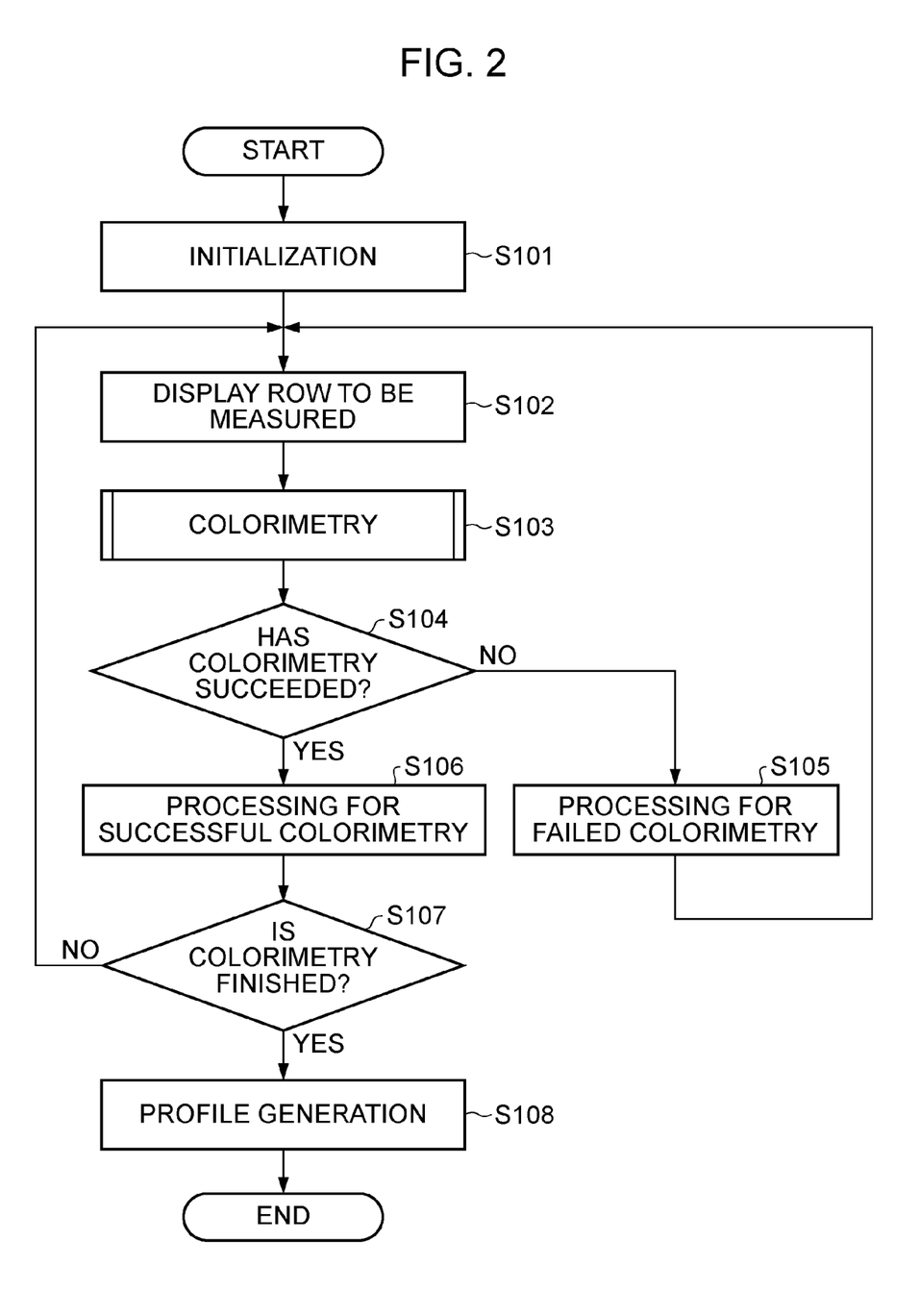
FIG. 2 is a flowchart illustrating an exemplary process of generating a color profile.

FIG. 2 is a flowchart illustrating an exemplary process of generating a color profile in accordance with the present embodiment. The CPU (not shown) executes the process shown in the flowchart of FIG. 2 using the respective components 101 to 108 in FIG. 1. First, the row counter 104 is initialized so that a first row is set (S101). The display unit 106 causes the display apparatus 12 to display a message indicating the set value of the row counter 104, thus prompting the user to measure the first row (S102). When viewing the displayed message, the user sets the calorimeter 13 on a color chart and slides the calorimeter 13 on color patches to perform colorimetry, i.e., measure the colors of the patches in the row designated by the message (S103). Although processing in step S103 will be described in detail later with reference to FIG. 4, the processing will be described briefly below. The calorimetric value acquisition unit 102 acquires the calorimetric values of the patches in one row, measured by the calorimeter 13 operated by the user, from the calorimeter 13 and transfers the values to the feature value calculation unit 103. The feature value calculation unit 103 calculates a feature value and outputs the value to the determination unit 105. The row counter 104 also outputs a feature value related to the row and the row number to the determination unit 105. The determination unit 105 compares the feature value calculated by the feature value calculation unit 103 with the feature value output from the row counter 104 to determine whether colorimetry has succeeded (S104). When it is determined in step S104 that colorimetry in step S103 has failed, the process proceeds to step S105. Whereas, when it is determined in step S104 that colorimetry in step S103 has succeeded, the process proceeds to step S106. In step S105, processing for failed colorimetry is performed and the process is returned to step S102. Specifically, the display unit 106 causes the display apparatus 12 to display a message indicating that colorimetry has failed and that the same row is to be measured again. In step S106, processing for successful colorimetry is performed. Specifically, the display unit 106 causes the display apparatus 12 to display a message indicating that colorimetry has succeeded. The calorimetric value storage unit 107 stores each calorimetric value in relation to the position of the corresponding color patch. The row number in the row counter 104 is increased by one. When it is determined in step S107 that the row number has not exceeded the final row number, the process is returned to step S102 and a message is displayed to prompt the user to successively measure the color patches in the next row. When it is determined in step S107 that the row number exceeds the final row number, this means that colorimetry on all of the color patches is finished, and processing proceeds to step S108. In step S108, the profile generation unit 108 obtains the calorimetric values related to the positions of the respective color charts from the calorimetric value storage unit 107 and generates a color profile.

Figure 3:
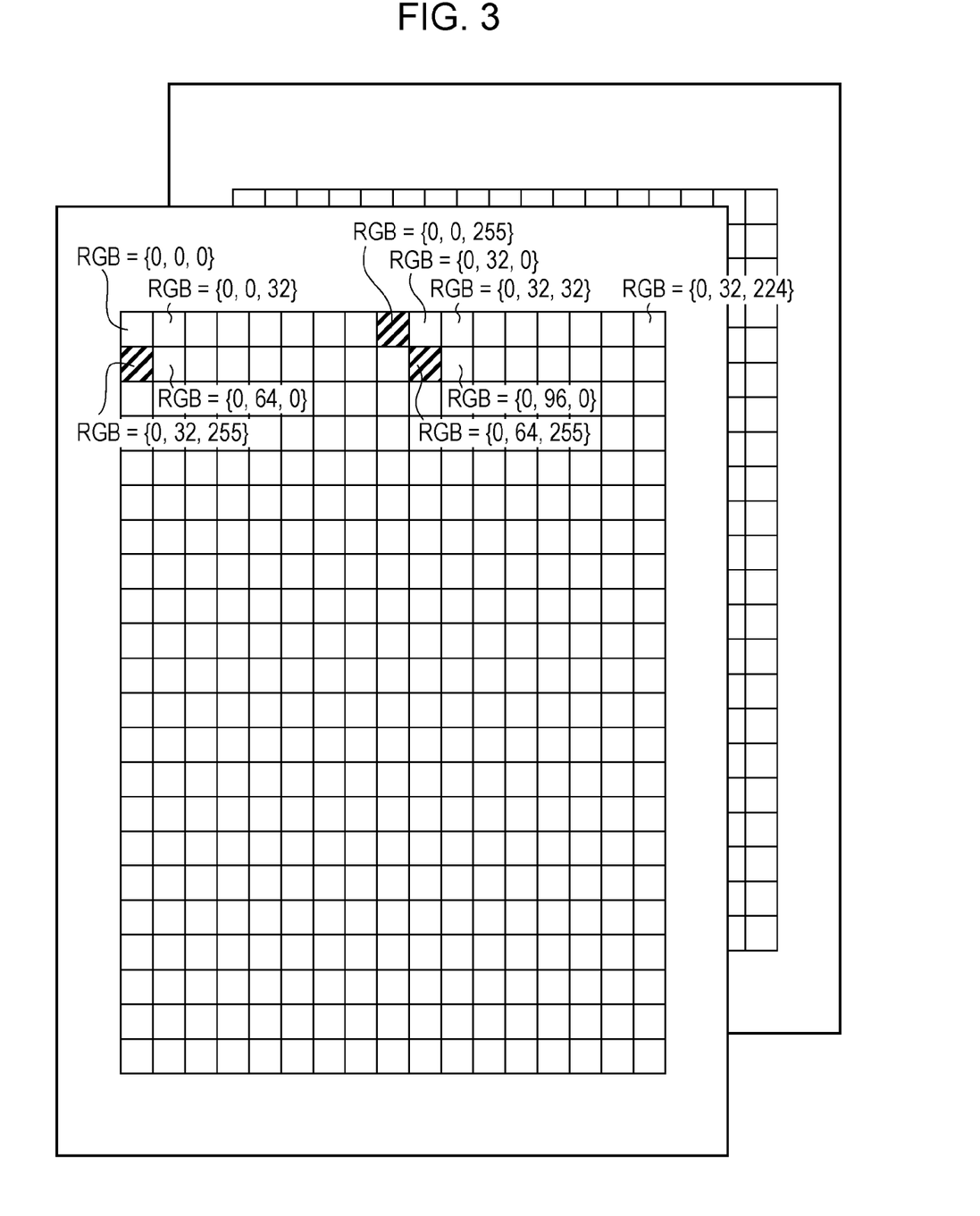
FIG. 3 is a diagram illustrating an exemplary color chart.

FIG. 3 is a diagram illustrating an exemplary color chart in the present embodiment. The color chart is printed by a printing system (e.g., a color ink jet printer, a color laser printer, a color multifunction device having a copy function and a printer function, another printer, or an image forming apparatus) in which the user intends to generate a color profile. In the printing system, R, G, and B values are represented using 256 values ranging from 0 to 255. The color chart includes color patches arranged in a matrix form, the number of patches arranged in each row being 17. The color chart includes all of 729 combinations of nine levels, i.e., 0, 32, 64, 96, 128, 160, 192, 224, and 255 representing R, G, and B values. The first patch from the left in the top row is black (RGB={0, 0, 0}). Patches having B values sequentially increased one-level by one-level are arranged on the right side of the first patch in this row. On the right side of a patch assigned with a B value of 255, a patch having a G value increased by one level and a B value of 0 (RGB={0, 32, 0}) is placed. Patches having the increased G value of 32 and B values sequentially increased one-level by one-level follow this patch. In this manner, the G and B values of patches are sequentially increased. Furthermore, on the right side of a patch assigned with a B value of 255 and a G value of 255, a patch having an R value increased by one level, a G value of 0, and a B value of 0 (RGB={32, 0, 0}) is placed. The R, G, and B values of patches are sequentially increased in the above-described manner. When the number of patches arranged horizontally reaches 17, the next patch is placed not on the right side of the preceding patch but the first position from the left in the next row below. When a sheet of paper is filled with patches, the next patch is placed on the first position from the left in the top row of another sheet.

This color chart includes the color patches arranged in accordance with the above-described rule. When attention is paid to the B values of adjacent patches, it is noted that the B values of patches change so as to jump from 255 to zero every nine patches. In this instance, let ΔB denote the difference in B value, serving as a component of a calorimetric value, between a patch and the adjacent patch that is to the right of the patch. In the following description, each patch having a large ΔB will be called a "jump patch". To easily understand jump patches in FIG. 3, some jump patches are shown by hatching. A measured color patch number counted from the left in each row of color patches will be called an "index" hereinafter. In the color chart in FIG. 3, the index of the jump patch in the first row is 9 and the indices of the jump patches in the second row are 1 and 10. The positions of jump patches vary from row to row. In addition, the number of jump patches varies from row to row.

The patches are arranged such that the degree of blue gradually increases toward each jump patch. Accordingly, the values ΔB of patches except jump patches each have a positive value. When B(n) denotes a B value of a patch having an index indicated by n, ΔB(n) representing the value ΔB of the index n is expressed as the following equation.

$$\Delta B(n) = B(n+1) - B(n) \tag{1}$$

Such a feature is a universal feature that does not depend on the type of sheet, on which the color chart is printed, or the color of sheet (base color). In the present embodiment, the calorimetric value acquisition unit 102 calculates such a feature as a feature value.

Figure 4:
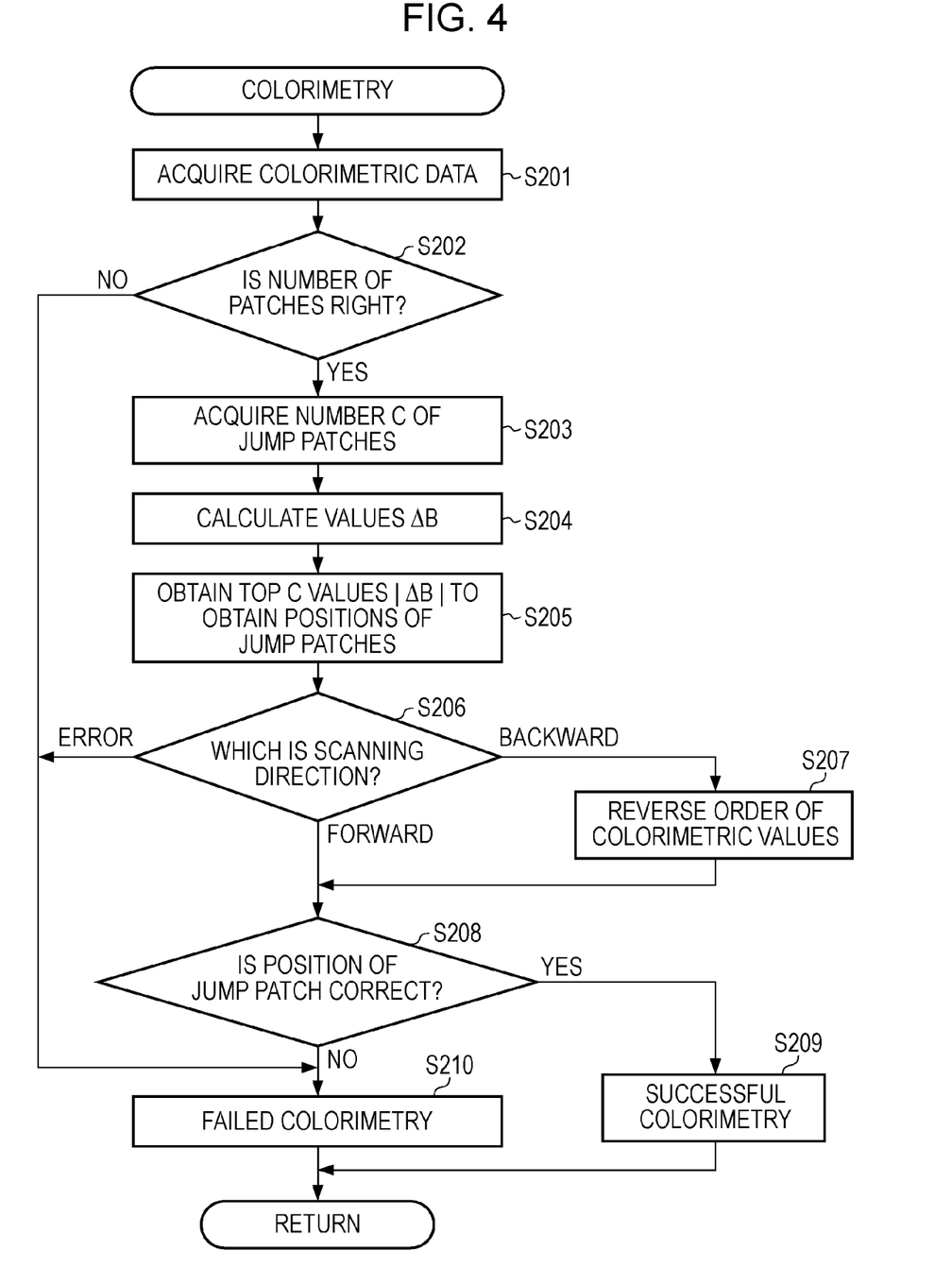
FIG. 4 is a flowchart illustrating a colorimetry process.

FIG. 4 is a flowchart illustrating an exemplary process corresponding to colorimetry in step S103 (FIG. 2) in the present embodiment. When the colorimetry process starts, the calorimetric value acquisition unit 102 acquires the calorimetric value of a patch from the calorimeter 13 (S201). The feature value calculation unit 103 counts the number of calorimetric values of patches acquired from the calorimetric value acquisition unit 102 and determines whether 17 patches have been measured for the result of colorimetry in one row (S202). When the number of patches is not right, information indicating that colorimetry has failed is set and the process then terminates (S210) and returns to FIG. 2 (step S104). When the number of patches is right, processing advances to step S203 and the row number L of a row which is being measured is obtained from the row counter 104 and the number C of jump patches related to the row is obtained from the table, shown in FIG. 5, and stored in the ROM or RAM (not illustrated). When a remainder obtained by dividing L by 9 is "0" or "1", C=1. When the remainder is not "0" or "1", C=2. Values ΔB of the indices 1 to 16 are obtained (S204). The absolute values |ΔB| of the 16 values ΔB are compared to obtain one or more top C values |ΔB| (S205). The index corresponding to each value ΔB indicates a jump patch. In step S206, the scanning direction is determined. When the value ΔB of each jump patch is negative, the scanning direction is forward. When the value ΔB of each jump patch is positive, the scanning direction is backward. When the values ΔB of the jump patches have different signs (values of ΔB include both negative values and positive values), an error is determined. When it is determined that the scanning direction of the color patches is backward, the order of the calorimetric values is reversed (S207). In this case, it is necessary to reverse the order of the jump patches, namely, interchange the jump patches. The correct index of each jump patch is obtained by subtracting the first obtained index from 17. When an error is determined in step S206, information indicating that colorimetry has failed is sent and the process then terminates (S210).

The determination unit 105 determines whether the position of each jump patch is correct (S208). Specifically, the index of each correct jump patch is obtained based on the row number obtained from the row counter 104 and it is determined whether the obtained index matches the index of the jump patch obtained by the feature value calculation unit 103. Since the index of each correct jump patch is predetermined, the index thereof can be obtained from the table, shown in FIG. 5, stored in the ROM or RAM (not shown). When the position of each jump patch is correct, information indicating that colorimetry has succeeded is sent and the process then terminates (S209). When the position thereof is incorrect, information indicating that colorimetry has failed is sent and the process then terminates (S210).

Figure 5:
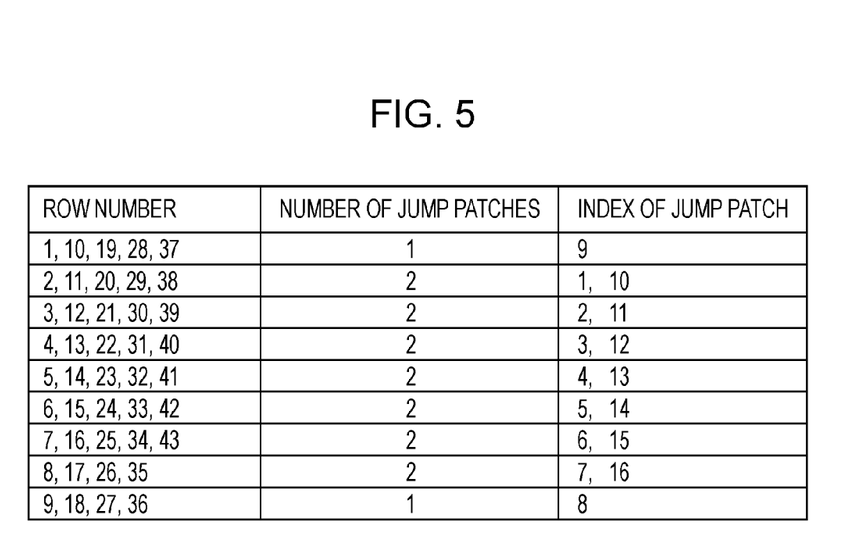
FIG. 5 is a table illustrating the number of jump patches and an index for each row.

In the color chart of the present embodiment, nine feature-value (index) patterns sequentially appear repeatedly as shown in FIG. 5. Thus, a row which is being measured can be discriminated from upper eight rows and lower eight rows. The user may accidentally displace a set position for colorimetry upward or downward by one or two rows. According to error determination in accordance with the present embodiment, effective information indicating that colorimetry has been performed in a row different from a target row to be measured can be provided to the user.

In the color chart in the present embodiment, the RGB colors each have nine levels and 17 color patches are arranged in the scanning direction. The number N of levels and the number X of patches in each row are not limited to the above-described values. Any combination may be used so long as a feature value is different from those in the upper one or two rows and/or those in the lower one or two rows. As for the color patches used in the present embodiment, the following conditions have to be satisfied between the number N of levels and the number X of patches.

$$(N+1) \leq X \text{ (X is not a multiple of N)} \quad (2)$$

When the numbers N and X are prime numbers, a row to be measured can be discriminated from the most number of rows. Accordingly, color patches can be processed effectively.

According to the present embodiment, error determination is performed using a feature value related to a row of color patches. Thus, an error caused by positioning of the calorimeter 13 relative to an improper row of color patches, an error caused by partial measurement of a proper row (i.e., the calorimeter is positioned relative to a proper row but the proper row is partially subjected to colorimetry), and an error caused by shifting the calorimeter from a proper row to the adjacent row during sliding can be determined. Furthermore, a calorimetric data error can be determined for errors caused due to the colorimeter's misrecognition, e.g., skipping a patch, or adding the calorimetric value of a nonexistent patch. In addition, error determination can be performed using a feature value obtained based on calorimetric values acquired from the colors of patches in one row. The feature value can be easily obtained based on calorimetric values or a theoretical value. Since error determination is performed using the maximum difference in color between adjacent patches, the determination is not effected by the type of sheet or the color of the sheet. Consequently, the present invention reduces the number of processing steps and the cost, and can also increase the reliability.

Since the scanning direction can be determined using a feature value, processing can be performed independently of the direction in which the user slides the calorimeter 13.

The present embodiment has been described using the RGB color space. The same advantages can be obtained in the use of another color space.

Another embodiment is derived by partially modifying colorimetry in the above-described embodiment. Therefore, a computer in the present embodiment has the same structure as that illustrated in FIG. 1 and the overall process is the same as that illustrated in the flowchart of FIG. 2.

Figure 6:
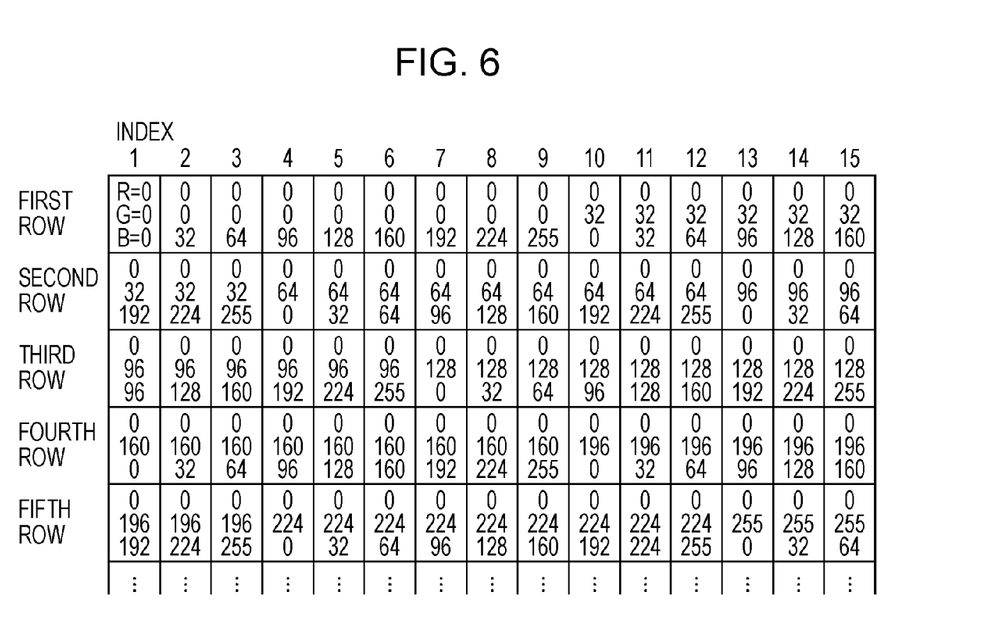
FIG. 6 is a diagram illustrating a test chart.

FIG. 6 is a diagram illustrating an exemplary color chart in the present embodiment. The color chart is printed by a printing system (e.g., a color ink jet printer, a color laser printer, a color multifunction device having a copy function and a printer function, another printer, or an image forming apparatus) in which the user intends to generate a color profile. In the printing system, R, G, and B values are represented using 256 values ranging from 0 to 255. The color chart includes color patches arranged in a matrix form, the number of patches arranged in each row being 15. The color chart includes all of 729 combinations of nine levels, i.e., 0, 32, 64, 96, 128, 160, 192, 224, and 255 representing R, G, and B values. The first patch from the left in the top row is black (RGB={0, 0, 0}). Patches having B values sequentially increased one-level by one-level are arranged on the right side of the first patch in this row. On the right side of a patch assigned with a B value of 255, a patch having a G value increased by one level and a B value of 0 (RGB={0, 32, 0}) is placed. Patches having the increased G value of 32 and B values sequentially increased one-level by one-level follow this patch. In this manner, the G and B values of patches are sequentially increased. Furthermore, on the right side of a patch assigned with a B value of 255 and a G value of 255, a patch having an R value increased by one level, a G value of 0, and a B value of 0 (RGB={32, 0, 0}) is placed. The R, G, and B values of patches are sequentially increased in the above-described manner. When the number of patches arranged horizontally reaches 15, the next patch is placed not on the right side of the preceding patch but the first position from the left in the next row below. When a sheet of paper is filled with patches, the next patch is placed on the first position from the left in the top row of another sheet.

Figure 7:
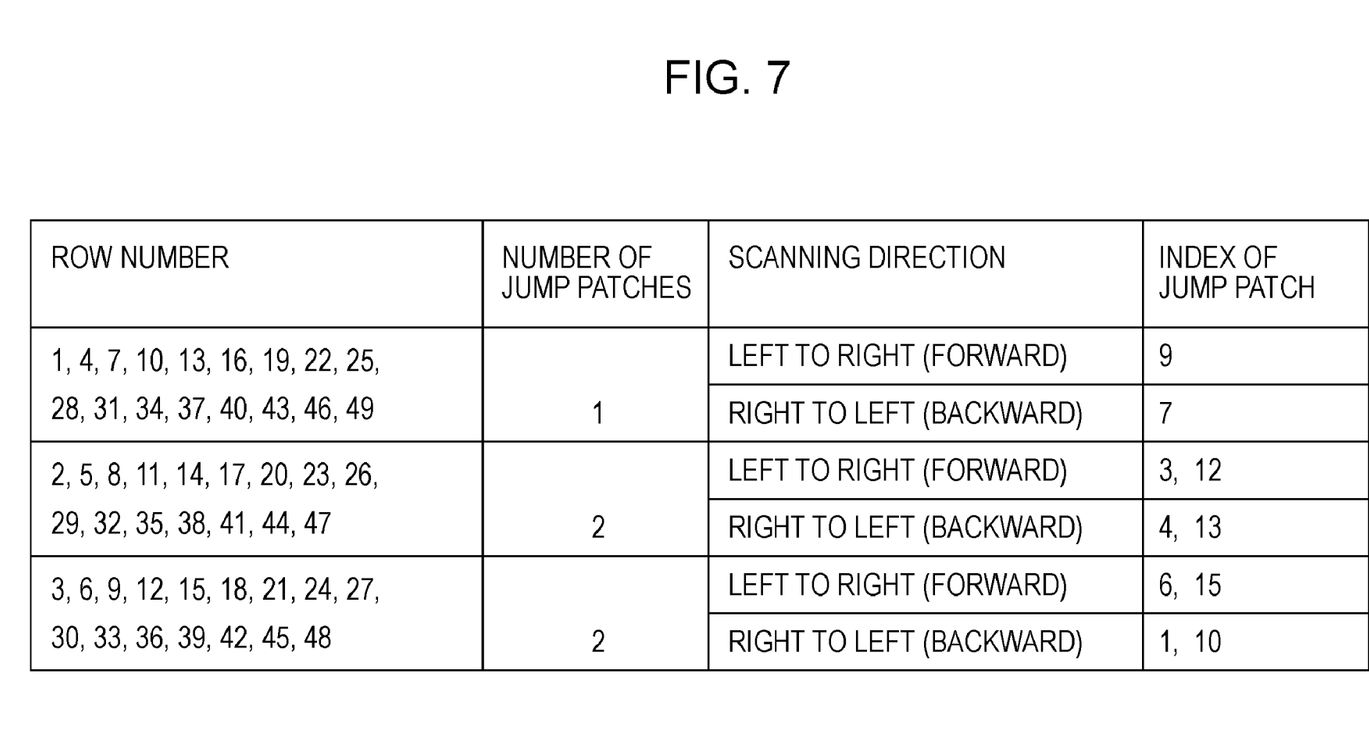
FIG. 7 is a table illustrating the number of jump patches and an index for each row.

FIG. 7 is a table including feature values in the color chart of FIG. 6. The table includes the number of jump patches in each row number and the index of each jump patch in the scanning direction in each row. When patches are scanned backward, an index number indicates a counted value obtained when an index number of 1 is assigned to the first patch from the right in each row, namely, the calorimetric value of the first-scanned patch. The table of FIG. 7 is stored in the ROM or RAM (not shown).

Figure 8:
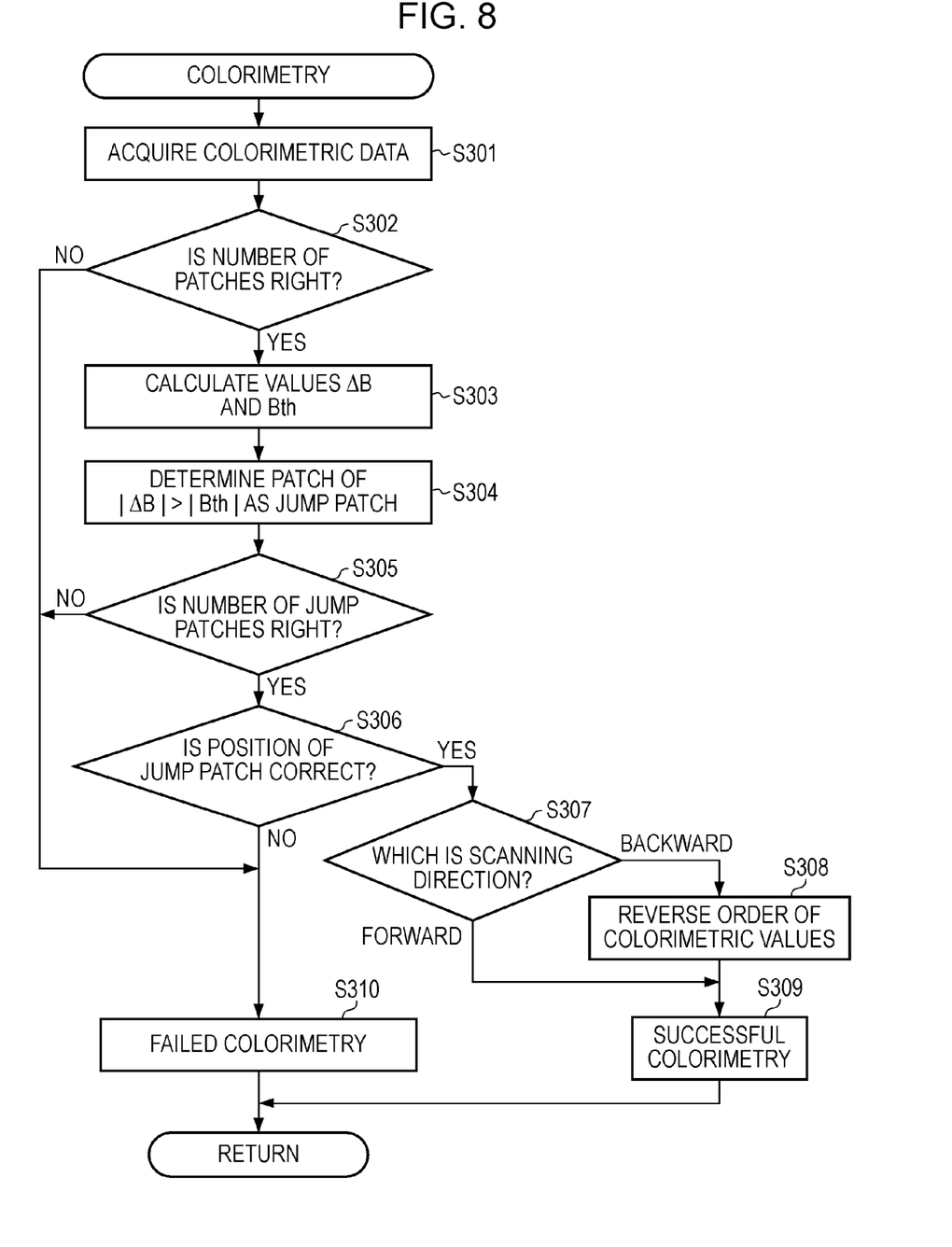
FIG. 8 is a flowchart illustrating a colorimetry process.

FIG. 8 is a flowchart showing an exemplary process corresponding to colorimetry in step S103 in the present embodiment. When the colorimetry process starts, the calorimetric value acquisition unit 102 acquires the calorimetric values of patches from the calorimeter 13 (S301). The feature value calculation unit 103 counts the number of calorimetric values acquired from the calorimeter 13 and determines whether 15 patches have been measured for the result of colorimetry in one row (S302). When the number of patches is not right, information indicating that colorimetry has failed is sent and the process then terminates (S310). When the number of patches is right, the values ΔB of patches having the indices 1 to 14 are obtained and a value Bth that is half of the difference between a maximum value Bmax and a minimum value Bmin in the calorimetric values is then obtained (S303). At least one patch satisfying a condition of |ΔB|>|Bth| is obtained and is determined as a jump patch (S304). The determination unit 105 obtains the number L of a row which is being measured from the row counter 104, obtains the number C of jump patches related to the row from the table, shown in FIG. 7, stored in the ROM or RAM (not illustrated), and compares the number C with the number of jump patches obtained in step S304 to determine whether the number of jump patches is right (S305). When the number of jump patches is not right, information indicating that colorimetry has failed is sent and the process then terminates (S310). When the number of jump patches is right, it is determined whether the index of at least one jump patch obtained by the feature value calculation unit 103 agrees (matches) with that related to the row number L (S306). In the present embodiment, the index of a correct jump patch is associated with each scanning direction in the table. When a proper row is scanned, the index of a jump patch matches with either one of at least two indices in the respective scanning directions. When the index of at least one jump patch does not match with each of the indices, information indicating that colorimetry has failed is sent and the process then terminates (S310). When the index of the jump patch matches with either of the indices, the scanning direction is determined based on the matched index (S307). When the scanning direction is backward, the order of calorimetric values is reversed (S308). Information indicating that colorimetry has succeeded is sent and the process then terminates (S309).

The value Bth used in the present embodiment is expressed by the following equation. A coefficient is not limited to 0.5. The coefficient can be set to a value larger or smaller than 0.5.

$$B\text{th}=0.5\times(B\max-B\min) \quad (3)$$

In the color chart in the present embodiment, three feature-value (index) patterns sequentially appear repeatedly as shown in FIG. 7. Thus, a row which is being measured can be discriminated from upper two rows and lower two rows. The user may accidentally displace a set position for colorimetry upward or downward by one or two rows. According to error determination in accordance with the present embodiment, effective information indicating that colorimetry has been performed in a row different from a target row to be measured can be provided to the user.

In the color chart in the present embodiment, the RGB colors each have nine levels and 15 color patches are arranged in the scanning direction. The number N of levels and the number X of patches are not limited to the above-described values. Any combination may be used so long as feature values are different from those in the upper one or two rows and/or those in the lower one or two rows. As for the color patches used in the present embodiment, the following conditions have to be satisfied between the number N of levels and the number X of patches.

$$(N+1)\leq X\,(X\text{ is not a multiple of }N) \quad (4)$$

In addition, when the numbers N and X have a common divisor other than "1", the index of at least one jump patch in the forward scanning direction does not match with that in the backward scanning direction. Accordingly, effective error determination including no error can be provided to the user.

According to the present embodiment, error determination is performed using a feature value related to a row of color patches. Thus, an error caused by positioning of the calorimeter 13 relative to an improper row of color patches, an error caused by partial measurement of a proper row (i.e., the calorimeter is positioned relative to a proper row but the proper row is partially subjected to colorimetry), and an error caused by shifting the calorimeter from a proper row to the adjacent row during sliding can be determined. Furthermore, errors caused due to the colorimeter's misrecognition, e.g., skipping a patch, adding the calorimetric value of a nonexistent patch, and a calorimetric data error can be determined. In addition, error determination can be performed using a feature value obtained based on calorimetric values acquired from the colors of patches in one row. The feature value can be easily obtained based on calorimetric values or a theoretical value. Since error determination is performed using the maximum difference in color between adjacent patches and the value Bth, serving as a threshold value, is enough large, the determination is not effected by the type of sheet or the color of the sheet. Consequently, while the number of processing steps and the cost can be reduced lower than those in related art, the reliability can be increased.

Since the scanning direction can be determined using a feature value, processing can be performed independently of the direction in which the user slides the calorimeter 13.

The present embodiment has been described using the RGB color space. The same advantages can be obtained in the use of another color space.

A computer-readable storage medium may store program code (software) for implementing the functions of the above-described embodiments. The program code stored on the computer-readable medium can be supplied to a system or apparatus and allowing a computer (or CPU or MPU) of the system or apparatus to read out and execute the program code stored in the computer-readable storage medium.

Examples of the computer-readable storage medium for supplying the program code include, but are not limited to, a flexible disk, a hard disk, an optical disk, a magneto-optical disk, a CD-ROM, a CD-R, a magnetic tape, a nonvolatile memory card, a ROM, and a DVD.

The functions of the above-described embodiments may be implemented by executing the read-out program code by the computer. In addition, the functions of the above-described embodiments may be implemented by allowing an operating system (OS) running on the computer to perform part or the whole of actual processing based on instructions of the program code.

Furthermore, the functions of the above-described embodiments may be implemented by writing the program code read out from the storage medium in a memory provided for a function expansion board incorporated in the computer, or a function expansion unit connected to the computer, allowing a CPU in the function expansion board or the function expansion unit to perform part or the whole of actual processing based on instructions of the program code.

According to the embodiments of the present invention, since the color chart generated so that feature values in respective rows differ from one another is used, error determination can be performed using a feature value obtained from the colors of patches arranged in each row without using a reference value and a threshold value for each individual patch. Although the related-art technique has required a large number of processing steps and a high cost of development, aspects of the present invention can provide an apparatus, method, and program for performing error determination with lower expenditure of cost and the lower number of processing steps than the related-art technique using reference values and threshold values for respective patches.

In addition, aspects of the present invention can provide an apparatus, method, and computer-readable medium storing a program for performing error determination using a color chart, which is generated so that a feature value in each row varies according to the scanning direction, even when colorimetry is performed in a backward scanning manner.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-162302 filed Jun. 20, 2008, which is hereby incorporated by reference herein in its entirety.

What is claimed is:

1. A color chart reading apparatus for acquiring colorimetric values of color patches by using a colorimeter which is manually slid by a user to perform colorimetry while scanning the color patches in the color chart on a row-by-row basis, the color chart reading apparatus comprising:

a colorimetric value storage unit configured to store: a first feature value relating to color arrangement of color patches of a multi-row having a color-difference for each row, in a predetermined scanning direction by the colorimeter for each row number and a third feature value for each row number, the third feature value being obtained when colorimetry is performed while the user slides the colorimeter in the direction opposite to the predetermined scanning direction relative to the color chart;

wherein the first feature value and the third feature value for each row are information items indicating the position of a patch having a larger color difference between the patch and the adjacent patch than the color difference between other adjacent patches, and the information items corresponding to the first and third feature values for each row differ from each other a feature value calculation unit configured to calculate a feature of the color arrangement of the color patches in each measured row as a second feature value based on the colorimetric values of the color patches acquired by the colorimeter in the predetermined scanning direction; and a determination unit configured to: compare the second feature value calculated by the feature value calculation unit in each measured row with the corresponding first feature value stored by the colorimetric value storage unit for each row and to determine whether the colorimetry by the colorimeter has succeeded or not based on a result of the comparison, to determine that colorimetry has been performed in the predetermined direction when the second feature value matches with the first feature value;

compare the second and third feature values to determine that colorimetry has been performed in the opposite direction when the second feature value matches with the third feature value; and determine an error when the second feature value does not match with each of the first and third feature values.

2. The color chart reading apparatus according to claim 1, wherein the first feature value is position information and/or number of patches having a larger color-difference between the patch and an adjacent patch than the color-difference between other adjacent patches for each row.

3. The color chart reading apparatus according to claim 1, wherein
the determination unit is configured to determine whether the colorimetry by the colorimeter has been performed in the predetermined scanning direction or in the direction opposite to the predetermined scanning direction,
the color chart reading apparatus further comprises a colorimetric value reverse unit configured to reverse the order of the colorimetric values of the color patches in each row when the determination unit determines that the colorimetry has been performed in the opposite direction of the predetermined scanning direction.

4. The color chart reading apparatus according to claim 1, further comprising:
a display unit configured to provide error information indicating an error of colorimetry to a display apparatus, wherein when the determination unit determines an error, the display unit causes the error information to be displayed on a display apparatus.

5. The apparatus according to claim 1, wherein the first feature value in each row differs from the first feature value in the adjacent row.

6. The apparatus according to claim 1, wherein the determination unit determines, based on a sign of the result of color-difference calculation performed in calculating the second feature value by the feature value calculation unit, whether the colorimetry has been performed in the predetermined scanning direction or in the direction opposite to the predetermined scanning direction.

7. A color chart reading method for acquiring colorimetric values of color patches using a colorimeter which is manually slid by a user to perform colorimetry while scanning the color patches in the color chart on a row-by-row basis, the color chart reading method comprising:

a storing step of storing a first feature relating to color arrangement of color patches of a multi-row having a color-difference for each row, in a predetermined scanning direction by the colorimeter for each row number and a third feature value for each row number is stored, the third feature value being obtained when colorimetry is performed while the user slides the colorimeter in the direction opposite to the predetermined scanning direction relative to the color chart;

wherein the first feature value and the third feature value for each row are information items indicating the position of a patch having a larger color difference between the patch and the adjacent patch than the color difference between other adjacent patches, and the information items corresponding to the first and third feature values for each row differ from each other:

a calculating step of calculating a feature of the color arrangement of the color patches in each measured row as a second feature value based on the colorimetric values of the color patches acquired by the colorimeter in the predetermined scanning direction; and a determining step of comparing the second feature value calculated by the feature value calculation unit in each measured row with the corresponding first feature value stored by the colorimetric value storing unit for each row and to determine whether the colorimetry by the colorimeter has been succeeded or not based on a result of the comparison, to determine that colorimetry has been performed in the predetermined direction when the second feature value matches with the first feature value;

comparing the second and third feature values to determine that colorimetry has been performed in the opposite direction when the second feature value matches with the third feature value; and determining an error when the second feature value does not match with each of the first and third feature values.

8. The color chart reading method according to claim 7, wherein the first feature value is position information or number of patches having a larger color difference between the patch and an adjacent patch than the color difference between other adjacent patches for each row.

9. The color chart reading method according to claim 7, wherein in the determining step, whether the colorimetry by the colorimeter has been performed in the predetermined scanning direction or in the direction opposite to the predetermined scanning direction is determined;
the method further includes a colorimetric value reversing step of reversing the order of the colorimetric values of the color patches in each row, and
when it is determined in the determining step that colorimetry has been performed in the opposite direction, the order of the colorimetric values is reversed in the colorimetric value reversing step.

10. The color chart reading method according to claim 7, further comprising:

an error information displaying step of providing error information indicating an error of colorimetry to the user, wherein when an error is determined in the determining step, error information is displayed in the error information displaying step.

11. A non-transitory computer-readable storage medium that stores a computer-executable color chart reading program allowing a computer to perform color chart reading for acquisition of colorimetric values of color patches using a colorimeter which is manually slid by a user to perform colorimetry while scanning the color patches in the color chart on a row-by-row basis, the color chart reading program stored on the computer-readable storage medium comprising:

a storing step of storing a first feature value relating to color arrangement of color patches of a multi-row having a color-difference for each row, in a predetermined scanning direction by the colorimeter for each row number and a third feature value for each row number, the third feature value being obtained when colorimetry is performed while the user slides the colorimeter in the direction opposite to the predetermined scanning direction relative to the color chart;

wherein the first feature value and the third feature value for each row are information items indicating the position of a patch having a larger color difference between the patch and the adjacent patch than the color difference between other adjacent patches, and the information items corresponding to the first and third feature values for each row differ from each other;

a calculating step of calculating a feature of the color arrangement of the color patches in each measured row as a second feature value based on the colorimetric values of the color patches acquired by the colorimeter predetermined scanning direction; and a determining step of: comparing the second feature value calculated by the feature value calculation unit in each measured row with the corresponding first feature value stored by the colorimetric value storing unit for each row and to determine whether the colorimetry by the colorimeter has been succeeded or not based on a result of the comparison, to determine that colorimetry has been performed in the predetermined direction when the second feature value matches with the first feature value;

comparing the second and third feature values to determine that colorimetry has been performed in the opposite direction when the second feature value matches with the third feature value; and determining an error when the second feature value does not match with each of the first and third feature values.

* * * * *